United States Patent

[11] 3,555,194

[72] Inventor Hirokazu Goto
Tokyo, Japan
[21] Appl. No. 775,696
[22] Filed Nov. 14, 1968
[45] Patented Jan. 12, 1971
[73] Assignee Nippon Electric Company, Limited
Tokyo, Japan
[32] Priority Nov. 17, 1967
[33] Japan
[31] No. 42/74022

[54] INTERSTATION SYNCHRONIZATION APPARATUS
14 Claims, 4 Drawing Figs.

[52] U.S. Cl. .......... 179/15, 331/12
[51] Int. Cl. .......... H04j 3/06
[50] Field of Search .......... 179/15 sync

[56] References Cited
UNITED STATES PATENTS

| | | | |
|---|---|---|---|
| 3,453,594 | 7/1969 | Jarvis | 179/15(sync) |
| 3,457,372 | 7/1969 | Karnaugh | 179/15(sync) |

*Primary Examiner*—Kathleen H. Claffy
*Assistant Examiner*—David L. Stewart
*Attorney*—Marn & Jangarathis

ABSTRACT: Interstation synchronization apparatus for a time division multiplex communication system having a plurality of communication stations is provided wherein multi-input, phase-controlled oscillator means, whose output signal represents the station synchronization signal, is present at each station therein. The multi-input, phase-controlled oscillator means is synchronized by a comparison of the synchronization signal generated thereby with synchronization signals generated at stations remotely located therefrom. The multi-input phase-controlled oscillator means is compensated for phase lags present in the externally generated synchronization signals as applied thereto by discrete signal levels introduced therein to control the frequency of the output signal thereof.

PATENTED JAN 12 1971

3,555,194

INVENTOR.
Hirokazu Goto
BY
Marn & Jangarathis
ATTORNEYS

INTERSTATION SYNCHRONIZATION APPARATUS

This invention relates to time division multiplex (TDM) communication systems and more particularly to interstation synchronization apparatus therefor.

Time division multiplex communication systems are known wherein both the transmission and the switching functions are accomplished by time division multiplex techniques that often involve pulse code modulation (PCM) modes of operation. These systems generally take the form of an integrated communication network comprising a plurality of remotely located communication stations which are mutually synchronized in frequency that the requisite separation of the time intervals into the proper subchannel relationships may be achieved at the receiver apparatus therefor present at said remotely located communication stations. In time division multiplex communication systems of this type a very successful interstation syncronization network has been developed which is known as the mutual synchronization system. The apparatus included in one such mutual synchronization network, as described in the article entitled "Mutual Synchronization of Geographically Separated Oscillators," by Messrs. A. Gersho and B. J. Karafin, appearing in The Bell System Technical Journal, Dec. 1966, at page 1689, contemplates a remotely located clock oscillator at each of the stations of the integrated communication system wherein each of the clock oscillators is composed of a multi-input, phase-controlled oscillator that is synchronized by the clocking signals of the other remotely located clock oscillators in the integrated communication network. This form of mutual synchronization network has shown itself to be highly convenient because when apparatus of this type is relied upon, the frequency stability of the clock oscillators used therein is not required to be excessively high, no master-slave relationship must exist between the various remotely located stations in the integrated communication network, and adverse effects of channel disturbances may be substantially localized. However, despite these important advantages, this apparatus is not free from fault because the transmission time of the various transmission lines interconnecting the stations in the integrated communication system and hence supplying the input signals to the respective inputs of each of the multi-input, phase-controlled oscillators has been found to adversely effect the clock frequency of the network due to the phase lags introduced thereby. In an effort to dissipate the adverse effects of the transmission time of said communication lines on the clock frequency of integrated communication networks utilizing such apparatus, the introduction of a delay line at a point in the feedback loop connecting the output of the variable frequency oscillator within each multi-input, phase-controlled oscillator to the group of the phase comparators, which act as the input portion of the multi-input circuit for each multi-input, phase-controlled oscillator, has been proposed. In accordance with this proposal, as exemplified at page 1701 of the foregoing Bell Systems Technical Journal article, the delay line would be capable of introducing a delay equal to the average delay time of the transmission line terminating at the station so that the oscillator output at each station is phase-compared, after being subject to the appropriate delay, with the received inputs of the remote stations connected thereto whereby the delay time of an interstation transmission line does not affect the system clock frequency. The apparatus resulting from the proposed introduction of the delay line, referred to hereinafter as a modified mutual synchronization system, has proved advantageous because it allows the system clock frequency to be selected independently of the transmission line delay and also because the employment of the delay line allows for the simplification of the total synchronization system. However, such modified mutual synchronization apparatus have been found difficult to realize in actuality because the respective delay lines therein must be adjusted with high precision so that the average delay time, which in most cases is not common to all the stations in the integrated communication system, is closely approached. Thus, as it is generally very difficult to achieve such precision in fine adjustment and further as long transmission lines often require delay lines having relatively large delays which thereby render it even more difficult to obtain a highly accurate delay interval, the modified mutual synchronization system described above does not offer a palatable, practical solution to the transmission line delay problems of present day mutual synchronization systems.

Therefore, it is an object of this invention to provide high performance interstation synchronization apparatus for eliminating the deleterious effects of interstation delay times on the system clock frequency without resorting to delay line expedients so that commercially practical interstation synchronization apparatus may be realized. Various other objects and advantages of the invention will become clear from the following detailed description of an embodiment thereof, and the novel features will be particularly pointed out in conjunction with the appended claims.

Although this invention is not limited to uses with any particular apparatus or in conjunction with any uses combination, the description hereof presented below is drawn to a basic embodiment which includes voltage controlled variable frequency oscillator means since voltage inputs are normally used as the control signals to such systems; however, as shall be apparent to those of ordinary skill in the art, current-controlled variable frequency oscillator means may be utilized as well herein whereupon the ancillary devices associated therewith would also constitute current responsive means.

In accordance with this invention, interstation synchronization apparatus for time division multiplex communication systems having a plurality of communication stations that each include multi-input, phase-controlled oscillator means for synchronizing the clock frequency of said communication system is provided wherein control signal adder means interposed between phase comparator means and a control signal input terminal of variable frequency oscillator means serves as said multi-input, phase controlled oscillator means and a control voltage, representing the average transmission delay time introduced between a given station and all other stations connected thereto, is additionally applied to the control signal input terminal of said variable frequency oscillator means to thereby compensate for the effect the clocking frequency of said variable frequency oscillator means produced by said transmission delay time. The invention will be more clearly understood by reference to the following detailed description of an embodiment thereof in conjunction with the accompanying drawings, in which:

FIG. 1 schematically illustrates a time division multiplex communication system including a plurality of remotely located stations;

Figures 1, 2:
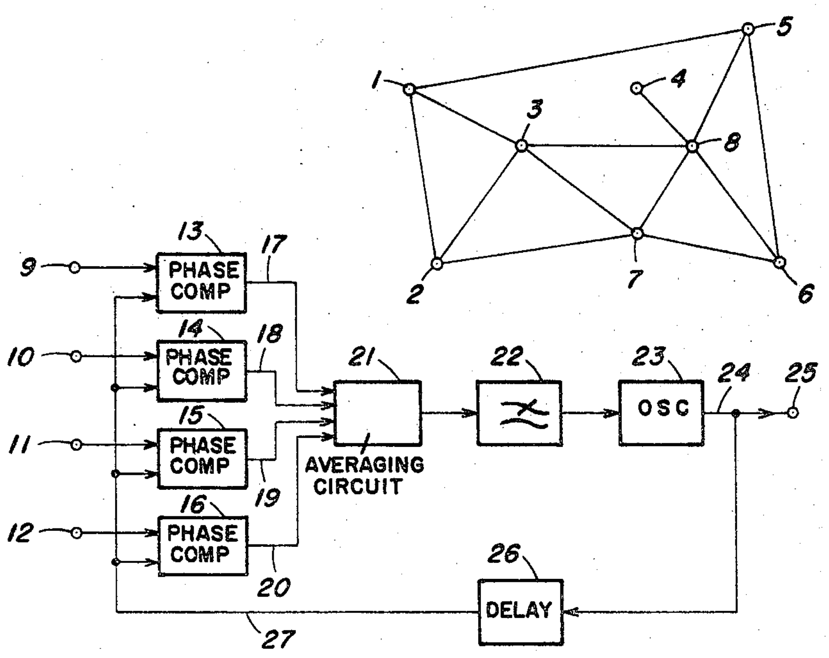
Fig. 1. Fig. 2. PRIOR ART
FIG. 2 is a block diagram of conventional interstation synchronization apparatus for a time division multiplex communication system such as that shown in FIG. 1.

Referring now to the drawings, and more particularly to FIG. 1 thereof, there is shown a schematic representation of a time division multiplex communication system, including a plurality of stations 1—8 which are interconnected to one or more of the other stations therein by a plurality of transmission lines, indicated by the solid lines in the FIG., in the manner shown. In addition, the depicted time division multiplex communication system may be considered to be only a part of a large communication network and, as is well known, each of the stations illustrated may be further connected to subordinate stations and/or additional independent stations which have not been shown herein. As is illustrated in FIG. 1, each of the stations 1—8 is connected to at least one other station in the communication network by an interstation transmission line, which may be assumed to be bidirectional with respect to synchronization signals, so that each station therein exchanges synchronization information with at least one other station. Accordingly, it will be seen by inspection of FIG. 1 that the following relationships exist between the depicted stations:

Station 1 is connected to stations 2, 3 and 5 and exchanges synchronization information with each of them.

Station 2 is connected to stations 1, 3 and 7 and exchanges synchronization information with each of them.

Station 3 is connected to stations 1, 2, 7 and 8 and exchanges synchronization information with each of them.

Station 4 is connected to station 8 and exchanges synchronization information with this station.

Station 5 is connected to stations 1, 6 and 8 and exchanges synchronization information with each of them.

Station 6 is connected to stations 5, 7 and 8 and exchanges synchronization information with each of them.

Station 7 is connected to stations 2, 3, 6 and 8 and exchanges synchronization information with each of them.

Station 8 is connected to stations 3, 4, 5, 6 and 7 and exchanges synchronization information with each of them. Thus, it will be seen that each station in the time division multiplex communication network illustrated in FIG. 1 receives synchronization signals from at least one other station therein and that such synchronization signals are supplied via the interstation transmission lines connecting these stations. However, as each interstation transmission line connecting the various stations will introduce a delay in time to the synchronization signal supplied thereby, it is apparent that if such transmission lines are long, the delay time introduced thereby cannot be ignored. To compensate for such introduced delay times in the synchronization signals, as previously mentioned, those of ordinary skill in the art have relied upon a modified mutual synchronization network adapted for the communication network illustrated in FIG. 1. Exemplary apparatus for achieving a modified mutual synchronization network is illustrated in FIG. 2.

FIG. 2 illustrates a form of conventional interstation synchronization apparatus for a time division multiplex communication system such as that shown in FIG. 1. As FIG. 2 principally illustrates a multi-input, phase-controlled oscillator, it should be understood at the outset that one such multi-input, phase-controlled oscillator is located at each of the stations indicated in FIG. 1 and said phase-controlled oscillators are interconnected in a manner to be hereinafter described by the interstation transmission lines so that a conventional modified mutual synchronization network may be realized. The apparatus illustrated in FIG. 2 essentially comprises a 4-input, phase-controlled oscillator which includes a plurality of phase comparators 13—16, averaging circuit means 21, low-pass filter means 22, variable frequency oscillator means 23, and delay means 26. The phase comparators 13—16 act as input devices to the multi-input, phase-controlled oscillator means depicted in FIG. 2 and hence one phase comparator is shown for each input thereto. The phase comparators 13—16 may take conventional form, well known to those of ordinary skill in the art, wherein each phase comparator 13—16 will generate an output signal, such as a voltage or pulse width, representative of and in response to the phase difference between the input signals applied thereto. Each of the phase comparators 13—16 illustrated in FIG. 2, includes a first input terminal means 9—12, respectively, which is connected via an interstation transmission line to the output of the variable frequency oscillator means present at another station while the second input terminal (not annotated) to each phase comparator 13—16 is commonly connected to the output of the controlled oscillator means 23 of the instant station via the delay means 26. Thus, it is seen that the 4-input, phase-controlled oscillator apparatus shown in FIG. 2 would be used in the case of a station which is interconnected with an exchanges synchronization information with four other stations as in the case of station 3 or 7, depicted in FIG. 1.

The outputs 17—20 of the 4-phase comparators 13—16 respectively are each connected to an input terminal of averaging circuit means 21, which may take the form of a network that sums the inputs thereto after applying a given weighting to each input. Hence, the circuit means 21 receives the four separate inputs thereto from the 4-phase comparators 13—16 weights and sums said inputs and applies as an output therefrom a signal representative of the weighted average thereof to the low-pass filter means 22. The low-pass filter means 22 acts in the well-known manner on the input signals applied thereto by the averaging circuit means 21 to convert such input signals into control signals which in the instant case would be control voltages. The output of the low-pass filter means is then applied to the variable frequency oscillator means 23 of the instant station which is a voltage controlled oscillator whose output frequency $f_{oi}$ (Hz) is governed thereby in the well-known manner. The output of the controlled oscillator 23 at line 24 is presented to the interstation transmission lines (not shown) connected to terminal 25 for application to the various stations connected thereto and in addition is applied to the second terminal of each of the phase comparators 13—16 via the delay means 26. The delay means 26 may take any of the conventional forms of delay means presently available which are capable of introducing the requisite delay to the output of the controlled oscillator means 23 to thereby retard said signals in phase. Thus, it will be seen that the interstation synchronization apparatus depicted in FIG. 2 receives synchronization information from four other stations and applies synchronization information to the stations connected thereto.

In operation, the synchronization signals received at the input terminals 9—12 of the depicted interstation synchronization apparatus are respectively phase compared with the delayed reference synchronization signals present on line 27 by the phase comparators 13—16. The outputs 17—20 of the phase comparators 13—16 are then respectively weighted and averaged by the averaging circuit means 21 and applied to the low-pass filter means 22 for conversion into a control voltage. The control voltage present at the output of the low-pass filter means 22 is applied to the variable frequency oscillator means 23 which in this case is a voltage-controlled device whose output frequency $f_{oi}$ (Hz), as determined by the control voltage applied thereto, includes the control information supplied from the other stations. The output of the controlled oscillator means 23 is applied via line 24 and terminal 25 to other stations as a synchronizing signal therefor, and in addition is fed back to the phase comparators 13—16, through delay means 26, so as to act as the reference input therefor. As previously mentioned, the delay time introduced to the output at line 24 of controlled oscillator means 23 by the delay means 26 should be precisely equal to the average interstation delay time of the links terminating at the station so that the effects of the transmission line delay time on the system clock frequency is eliminated. The need for precise adjustment of the delay means 26 may be demonstrated by assuming that when the communication system is in synchronism with the system clock frequency $f$ (Hz), the synchronous self-oscillation frequency of a station $i$ is $f_{oi}$ (Hz), the weighting factor of the station $i$ for a station $j$ is $\alpha 1ij$, the DC gain of the low-pass filter at station $i$ is $\alpha 2i$, the gain of the variable frequency oscillator means (in this case voltage controlled) at station $i$ is $\alpha 3$(hz/V), the output phase of the station $i$ is $\Phi_{oi}$ the output phase of a station $j$ is $\Phi_{oj}$, the transmission delay time in the interstation transmission line connecting stations $i$ and $j$ is $\tau ij$ in seconds, and the delay time inserted by the feedback delay means 26 is D$i$. Then, the system clock frequency $f$ (Hz) may be written in terms of station $i$ as follows:

$$f=foi+\alpha 3i\cdot\alpha 2i\sum_{j}\alpha lij[(\phi oj-2\pi f\tau ij)-(\phi oi-2\pi fDi)]$$
$$=foi+\alpha 2i\alpha 3i\sum_{j}\alpha lij(\phi oj-\phi oi)$$
$$-2\pi f\alpha 2i\alpha 3i\sum_{j}\alpha lij\cdot(\tau ij-Di)$$
$$=foi+\alpha i\sum_{j}\alpha lij(\phi oj-\phi oi)$$
$$-2\pi f\alpha i\left\{\left(\sum_{j}\alpha lij\tau ij\right)-Di\right\} \qquad (1)$$

where $\alpha i=\alpha 2i\cdot\alpha 3i;\ \sum_{j}\alpha lij=1.$

As $\sum_{j}\alpha lij\tau ij$ is the mean value of the interstation transmission line delay times between the station $i$ and all other stations connected thereto and hence exchanging synchronization information therewith, when D$i$ is made equal to $$\sum_{j}\alpha lij\tau ij,\ \text{i.e.,}\ Di=\sum_{j}\alpha lij\tau ij \qquad (2)$$

equation (1) reduces to, $$f=foi+\alpha i\sum_{j}\alpha lij(\phi oj-\phi oi) \qquad (3)$$

Accordingly, it will be seen that when equation (2) obtains, the system clock frequency $f$ becomes independent of the interstation transmission line delay time $\tau ij$. Furthermore, since equation (3) holds for any and all stations $i$, the system frequency $f$ may be expressed by the relationship, $$f=\frac{\sum_{j}\frac{foi}{Bi}}{\sum_{j}\frac{1}{Bi}} \qquad (4)$$

where $\alpha lij$ is independent of the station $j$, so that the identity $\alpha lij=\alpha lj,\ \alpha li\cdot\alpha i\equiv Bi$ holds. Therefore, it will be seen that for the relationship set forth by equation (4) to prevail, the conditions required by equation (2) must be satisfied and hence the delay time introduced by the delay means present at each station must exactly coincide with the average delay required for that station. However, as aforesaid, because the average delay time at each station is different, precise adjustment of the delay times is difficult to carry out at reasonable cost and long transmission lines render accurate adjustment exceptionally difficult; the depicted apparatus for interstation synchronization of time division multiplex communication systems have proven impractical. Therefore, it is a prime objective of this invention to provide interstation synchronization apparatus having the high performance capabilities of a modified mutual synchronization system such as that illustrated in FIG. 2 without resort to delay line expedients and their attendant disadvantages.

Figure 3:
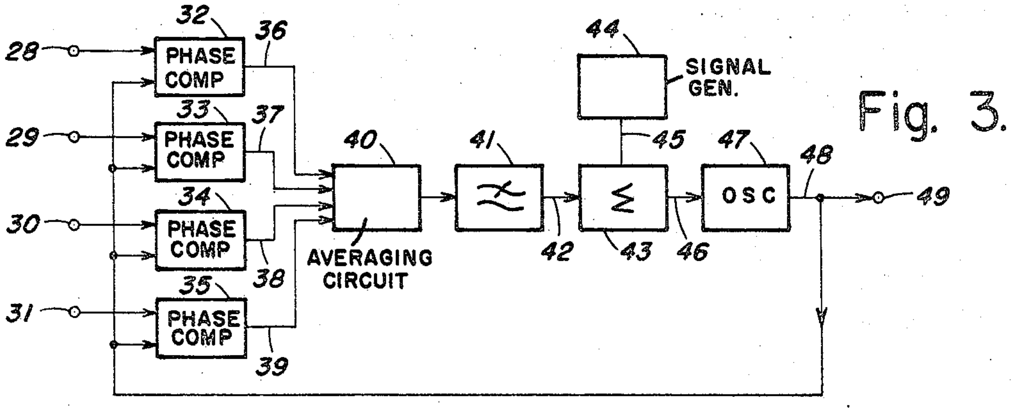
FIG. 3 is a block diagram of an embodiment according to the present invention of interstation synchronization apparatus for a time division multiplex system.

An exemplary embodiment of the interstation synchronization apparatus in accordance with this invention is illustrated in FIG. 3. The embodiment of this invention illustrated in FIG. 3, as was the case with regard to FIG. 2, is drawn principally to a multi-input, phase-controlled oscillator which would be present at a given station in a time division multiplex system such as that described in conjunction with FIG. 1. Accordingly, it will be apparent that one such multi-input, phase-controlled oscillator having the requisite number of inputs thereto would be included at each station within a time division multiplex system and said phase-controlled oscillators will be interconnected by interstation transmission lines in a manner to be described hereinafter so that a complete interstation synchronization network as contemplated by this invention may be realized.

The interstation synchronization apparatus depicted in FIG. 3 essentially comprises a 4-input phase-controlled oscillator which includes a plurality of phase comparators 32—35, averaging circuit means 40, low-pass filter means 41, adder circuit means 43, signal generator means 44 and variable frequency oscillator means 47. In addition, as this embodiment may be assumed to receive voltage control inputs as distinguished from current control inputs, the signal generator means 44 will generate a voltage signal, the adder circuit means 43 will be responsive to voltages, and the variable frequency oscillator means 47 may be voltage-controlled oscillator means. The phase comparators 32—35 act as input devices to the multi-input phase-controlled oscillator apparatus depicted in FIG. 3 and may take the form of any circuit means capable of measuring a phase reference or time difference between a pair of input signals thereto and supplying an output signal representative of such difference. An example of suitable circuit means for achieving the function of each of the depicted phase comparators 32—35 would be a flip-flop circuit which is set by one input applied thereto and reset by a second input thereto. Each of the phase comparators 32—35 illustrated in FIG. 3 includes a first input terminal means 28—31 respectively which is connected through an interstation transmission line to the output of the controlled oscillator means present at another station while the second input terminal (not annotated) to each phase comparator 32—35 is commonly connected to the output of the controlled oscillator means 47 of the station under discussion. Thus, it will be seen that the interstation syncronization apparatus depicted in FIG. 3 admits of connection to four other stations and hence the illustrated input configuration thereto is used where the illustrated apparatus is present at stations such as 3 or 7 shown in FIG. 1.

The output 36—39 of each of the phase comparators 32—35 respectively is connected to the input terminals of the averaging circuit means 40 which may be similar to the averaging circuit means 21 previously described with regard to FIG. 2 or may take the form of a resistor-type voltage divider wherein the weighting resistors are used in combination with a unit-gain amplifier. The averaging circuit means 40 thus receives four separate input signals from the phase comparators 32—35, applies a predetermined weighting to each of said input signals and thereafter averages such weighted signals by a summing technique. The output of the averaging circuit means 40 is applied to the low-pass filter means 41 wh may take the same form as that previously described with regard to FIG. 2 and acts to convert the input signals applied thereto to a first control signal which in this case would be a control voltage. It should be noted, however, that separate low-pass filter means could be directly connected to the outputs of the phase comparators 32—35 whereby the averaging circuit means 40 would be positioned in the circuit following such low-pass filter means and connected to the outputs thereof or alternatively, the averaging circuit means 40 could be combined with the adder circuit means 43 by suitable selection of the operational resistances therein.

The first control signal produced by the low-pass filter means 41 depicted in FIG. 3 is applied to a first input 42 of the adder circuit means 43 which in this case, as previously mentioned, is a voltage adder. The adder circuit means 43 may comprise any of the well-known forms of adder circuitry such as the simplified forms of resistor-type adders or adder circuits which simply resort to Kirchhoff's law, however, more sophisticated adder circuits which include operational amplifiers have proved to be more feasible. Exemplary of such sophisticated adder circuits are those presently used in conjunction with analogue computers. The second input 45 to the adder circuit means 43 is supplied by signal generator means 44 which would constitute a voltage generator in the instant embodiment of the invention as illustrated in FIG. 3. The purpose of the signal generator is to compensate for the interstation delay time introduced by the transmission lines connecting the various stations to the input terminals 28—31 of the phase comparators 32—35, respectively. The signal generator means 44 may take the form of a reference signal generator or in this case a reference voltage generator which generates a voltage determined by the interstation delay time as determined by calculation or measurement Although the simplest form of circuit which could constitute the signal generator means 44 would comprise a resistance-type voltage divider connected to a power supply; a combination of a pulse generator, that produces a pulse train having pulses whose amplitude or width changes in proportion to the interstation delay time and a low-pass filter for smoothing the pulse train applied thereto is preferred to facilitate the stabilization and setting of the voltage applied as well as to provide automatically adjusting voltage control means therein. Alternatively, a signal generator which includes a DC power supply, an operational resistance means, and an operational amplifier will provide highly advantageous results. The later form of signal means 44 is illustrated in FIG. 4.

Figure 4:
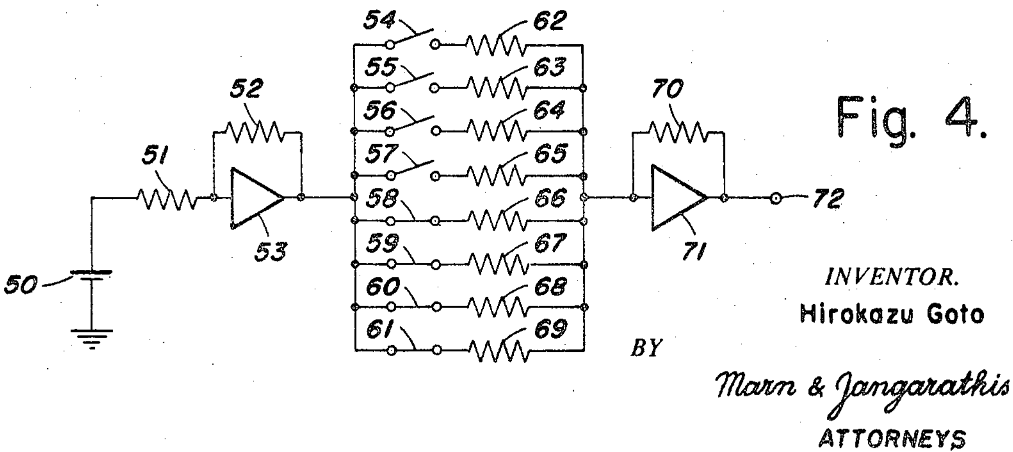
FIG. 4 is a circuit diagram of exemplary control signal generator means for compensating for the interstation delay time usable in the embodiment of this invention illustrated in FIG. 3.

Referring now to FIG. 4, there is shown an illustrative circuit embodiment usable as the control signal generator means 44 depicted in FIG. 3. The exemplary circuit for the control signal generator means 44 shown in FIG. 4 comprises a DC reference voltage supply 50, a first operational amplifier 53, a group of selectable resistors connected in parallel 62—69 and a second operational amplifier 71. The DC reference voltage supply 50, which may comprise a Zener diode or a similar device, is connected to the input terminal of the first operational amplifier 53 through an input resistor 51 therefor. A feedback resistor 52 is also connected between the input and the output terminals of the operational amplifier 53 so that the operational amplifier 53 acts as an inverting amplifier whose output impedance is small. As is apparent, since the operational amplifier 53 merely acts as a buffer, the operational amplifier 53 may be omitted if the output impedance of the DC reference voltage supply is small and the reference voltage thereof may be arbitrarily chosen. The output of the operational amplifier 53 is applied to a variable voltage generator composed of the group of selectable resistors 62—69 connected in parallel and the second operational amplifier 71. The second operational amplifier 71 has a feedback resistor 70 operably connected between the input and output terminals thereof while the group of selectable resistors 62—69 connected in parallel are interposed between the output of the first operational amplifier 53 and the input to the second operational amplifier 71 whereby the selected resistors of the selectable group of resistors 62—69 act as input resistors for said second operational amplifier 71. As may be seen by inspection of FIG. 4, the group of selectable resistors 62—69 connected in parallel comprise a plurality of resistors 62—69 which are each connected between the output of the operational amplifier 53 and the input of the operational amplifier 71 through a switch means 54—61, respectively. The switches 54—61 may be relay actuated or remotely controlled by other circuit devices well known in the art. The resistors 62—70 are selected so that their relationship is, for example, $2^{-7}$: $2^{-6}$: $2^{-5}$: $2^{-4}$: $2^{-3}$: $2^{-2}$: $2^{-1}$: 1:1, respectively; whereby upon the closure of only switch 54, a voltage output is present at the output of the operational amplifier 71 which has amplitude $2^7$ times as large as the output of the operational amplifier 54 while, if one of the other switches 55—61 are closed and the remaining switches 55—61 are maintained in the opened condition, the output of the operational amplifier 71 will be of a magnitude equal to the reciprocal of the quantity which the resistor connected to the closed switch bears to the other resistors present, multiplied by the output voltage of the operational amplifier 53. When more than a single switch 54—61 is closed, the output of the operational amplifier 71 will equal the sum of the voltages which would be present at the output of the operational amplifier 71, if the closed switches were individually closed. Thus, if the switches 54—61 are in the condition illustrated in FIG. 4, for example, wherein switches 54—57 are in an open condition while switches 58—61 are closed, the output voltage present at the output terminal 72 of the operational amplifier 71 would be 15 times as large as the output voltage of the operational amplifier 53. With the circuit depicted in FIG. 4 utilized as the control signal generator means 44, a wide range of control signals having arbitrary amplitudes is available. Further, when the circuitry illustrated in FIG. 4 is relied upon. not only may remote actuation of the switches 54—61 be accomplished by relays or the use of electronic switches, but in addition thereto, automatic control may be provided therefor to achieve an automatic interstation delay time control function by introducing a suitable control circuit to the depicted circuits.

Returning now to FIG. 3, it will be seen that the output of the adder circuit means 43 as applied to line 46 is representative of the first control signal applied thereto by the low-pass filter means 41 and the second control signal applied thereto by the control signal generator means 44. The output of adder circuit means 43 is applied to the variable frequency oscillator means 47 which in the instant case is a voltage-controlled oscillator whose output frequency $f_{oi}$ (Hz) is governed thereby in the well-known manner. The output of the variable frequency oscillator 47 as present on line 48 is applied to the interstation transmission lines (not shown) connected to terminal 72 for application to the various stations connected thereto and in addition, is applied directly to the second terminal of each of the phase comparators 32—35. Thus, it is seen that the interstation synchronization apparatus depicted in FIG. 2 receives synchronization information from four stations external thereto and applies synchronization information to the stations connected thereto.

In operation, the embodiment of the invention depicted in FIG. 3 receives synchronization signals at the input terminals 28—31 of the illustrated interstation synchronizing apparatus from four separate stations in time division multiplex communication system which may be represented by the diagrammatic showing in FIG. 1 of one such system. The received synchronization information from each of the external stations connected to input terminals 28—31 is respectively phase compared by the phase comparators 32—35 with the reference synchronization signals present at the output of the controlled oscillator means 47 and supplied directly to the second inputs of the phase comparators 32—35. The resulting outputs of the phase comparators 32—35 present at outputs 36—39 respectively are applied to the averaging circuit means 40 were each of the signals received at weighted and thereafter averaged. The output of the averaging circuit means 40, which represents the weighted average of the phase differences received by said averaging circuit means 40, are then applied to the low-pass filter means for conversion, in the well-known manner, into a first control signal that is furnished to the first input 42 of the adder circuit means 43. The second control signal for the adder circuit means 43 is supplied thereto at terminal 45 thereof by the control signal generator 44 whereupon said adder circuit means 43 applies a control signal, which in this case is a voltage, representative of both the first and second control signals applied thereto to the variable frequency oscillator means 47. The output of the variable frequency oscillator, which in this case is a voltage controlled oscillator having an output frequency $f_{oi}$ (Hz), represents the result of the control imposed thereon by the stations connected to the input terminals 28—31 and is the synchronization frequency generated by the station. The synchronization frequency $f_{oi}$ (Hz) thus generated is fed back directly to the phase comparators 3—35 for application to the second input terminals thereof and simultaneously therewith is transmitted from output terminal 49 over the interstation transmission lines connected thereto to other stations. It should be noted, that in the illustrative embodiment of this invention depicted in FIG. 3, the output of the variable frequency oscillator means 47 has been indicated as being directly utilized for synchronization, however, compensate practical embodiments interstation this invention, the synchronizing signals present at terminal 49 may be first subject to frequency division prior to transmission to other stations in the Accordingly, division multiplex communications system.

The second control signal furnished by the signal generator 44 serves, as previously mentioned, to compensate for the interstation delay times introduced to the synchronizing signals applied from other stations in the communications system by the various interstation transmission lines connecting such signals. Accordingly, the magnitude of the second control signal applied by the signal generator 44 is set to a value equal to the average of the varying delay times between the given station at which the depicted apparatus of FIG. 3 is located and each of the other stations connected thereto wherein each of said varying delay times may be measured or calculated. Therefore, the introduction of the second control signal having the appropriated value as defined above serves to compensate for the various introduced delay times so that the effect of interstation delay time on the system clock frequency is eliminated without resort to delay lines to thereby achieve system synchronization comparable to that derived by a modified mutual synchronization system. This may be seen, if it is assumed that the necessary interstation delay time compensating voltage at a station $i$ when the network is in synchronism with frequency $f$(Hz) is $V_i$ (V). Then further adapting the same symbolism utilized with regard to FIG. 2, the frequency $f$ may be expressed as:

$$f=foi+\alpha 3i\left[\alpha 2i\sum_{j}\alpha lij(\phi oj-2\pi f\tau ij-\phi oi)+Vi\right]$$
$$=foi+\alpha 2i\cdot\alpha 3i\sum_{j}\alpha lij(\phi oj-\phi oi)$$
$$-2\pi f\alpha 2i\alpha 3i\left(\sum_{j}\alpha lij\tau ij\right)+\alpha 3iVi.$$

Then substituting $\alpha i=\alpha 2i{*}{*}\alpha 3i$, $f$ may be written as $$f=foi+\alpha i\sum_{j}\alpha lij(\phi oj-\phi oi)$$
$$-\alpha 3i\left[\alpha 2i\cdot 2\pi f\left(\sum_{j}\alpha lij\gamma ij\right)-Vi\right]$$
$$=foi+\alpha i\sum_{j}\alpha lij(\phi oj-\phi oi)-\alpha 3i(\alpha 2i\cdot 2\pi f\tau iav-Vi) \quad (5)$$

where $iav=\sum_{j}\alpha li\,j\,ij$ and $\tau iav$ is the average inter-station delay which is substantially equal to $$\sum_{j}\alpha lij\tau ij.$$

Therefore, if $Vi$ is made equal to $\alpha 2i{*}{*}2\pi fiav$ i.e., $$Vi=\alpha 2i\cdot 2\pi f\cdot\tau iav \quad (6)$$

equation (5) reduces to $$f=foi+\alpha i\sum_{j}\alpha lij(\phi oj-\phi oi) \quad (7)$$

which is identical to equation (3) derived for the modified mutual synchronization system depicted in FIG. 2. Therefore, it will be see that by setting the voltage $Vi$ equal $\alpha 2i{*}{*}2\pi fiav$ as specified in equation (6) for each station in the time division multiplex communications system using the embodiment of the invention depicted in FIG. 3, the system clock frequency can also be represented by equation (4). Thus, the synchronization apparatus according to the present invention will eliminate the effect of the interstation delay time on the system clock frequency without the use of delay lines as the apparatus according to the present invention yields the same function as the modified mutual synchronization system depicted in FIG. 2. Furthermore, as the value requiring precision as specified by equation (6) is a voltage magnitude, a highly accurate adjustment may be easily obtained regardless of the length of the transmission lines involved or the varying requirements of separate stations. In addition, as voltage adjustments readily admit of remote control techniques, the system as a whole may easily be controlled by adjustment means located at a single station within the system. Accordingly, it will be seen that interstation synchronizing apparatus has been provided in accordance with the objectives of this invention.

Although this invention has been described in conjunction with the exemplary embodiment depicted in FIG. 3, it will be obvious to those of ordinary skill in the art that various modifications of the depicted apparatus may be made to satisfy design criteria or to suit convenience without altering the teachings of this invention. For instance, current control may be adapted or the various stages of the apparatus may be juxtaposed in position and/or combined. Illustrative of the latter modification would be the combination of the averaging circuit means and the adder circuit means while separate low-pass filter means would be connected to each output of the phase comparator means.

While the invention has been described in connection with a specific embodiment thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

I claim:

1. Interstation synchronization apparatus for time division multiplex communication systems, said apparatus including multi-input phase-controlled oscillator means comprising at lease one phase comparator means and variable frequency oscillator means, said at least one phase comparator means being adapted to receive first and second input signals and produce in response thereto an output signal representative of the phase difference therebetween, said first input signal being representative of an externally generated synchronization signal and said second input signal being representative of the output of said variable frequency oscillator means, said variable frequency oscillator means producing an output signal having a frequency determined by signals applied to a control input terminal thereof; the improvement comprising:

signal adder means having a plurality of inputs thereto electrically interposed between said at least one phase comparator means and said control input terminal of said variable frequency oscillator means, said signal adder means thereby being adapted to receive the output of said at least one phase comparator means at one of said plurality of inputs thereto and apply a control signal to said control input terminal of said variable frequency oscillator means; and signal generator means operably connected to a second input of said signal adder means, said signal generator means being adapted to apply a signal to said second input of said signal adder means for compensating for a predetermined delay present in said first input signals applied to said phase comparator means.

2. The apparatus of claim 1, the improvement additionally comprising feedback means directly connecting information representative of the output of said variable oscillator means to said phase comparator means to provide said second input signals thereto.

3. The apparatus of claim 2, the improvement additionally comprising low-pass filter means electrically interposed between the output of said at least one phase comparator means and said one of said plurality of inputs to said signal adder means.

4. The apparatus of claim 2, the improvement further comprising:

additional phase comparator means, said additional phase comparator means each being adapted to receive first and second input signals and produce in response thereto an output signal representative of the phase difference therebetween, said first input signal to each of said additional phase comparator means being representative of an externally generated synchronization signal and said second input signal being representative of the output of said variable frequency oscillator means; and means for combining the output signals of each of said phase comparator means and applying said combined signals to said one of said plurality of inputs to said signal adder means.

5. The apparatus of claim 4, wherein said signal combining means comprises weighted averaging circuit means whereby each of said output signals are individually weighted prior to their combination by the averaging portion of said weighted averaging circuit means.

6. The apparatus of claim 5, the improvement additionally comprising low-pass filter means electrically interposed between the output of said weighted averaging circuit means and said one of said plurality of inputs to said signal adder means.

7. In an interstation clock synchronization network for time division multiplex communication systems having a plurality of communication stations, said network including multi-input phase controlled oscillator means located at each station, each of said multi-input phase-controlled oscillator means located at each station comprising at least one phase comparator means and variable frequency oscillator means, said at least one phase comparator means being adapted to receive first and second input signals and produce in response thereto an output signal representative of the phase difference therebetween, said first input signals being representative of the output of a variable frequency oscillator means present at a remotely located communication station within the time division multiplex communication system and said second input signal being representative of the output of said variable frequency oscillator means located at the same station within the time division multiplex communication system, said variable frequency oscillator means producing a synchronization signal whose frequencies are determined by signals applied to a control input terminal thereof; the improvement comprising:

signal adder means located at each station having a plurality of inputs thereto electrically interposed between said at least one phase comparator means and said control input terminal of said variable frequency oscillator means, said signal adder means thereby being adapted to receive the output of said at least one phase comparator means at one of said plurality of inputs thereto and apply a control signal to said control input terminal of said variable frequency oscillator means; and signal generator means located at each station operably connected to a second input of said signal adder means, said signal generator means being adapted to apply a signal to said second input of said signal adder means for compensating for delays present in said first input signals to said phase comparator means.

8. The apparatus of claim 7, the improvement additionally comprising feedback means located at each station directly connecting information representative of the output of the variable oscillator means located at a given communication station to said phase comparator means located at that station to provide said second input signals thereto and transmission line means located at each station for additionally applying information representative of the output of said variable oscillator means located at said given communication station to phase comparator means of at least one remotely located station to provide said first input signals thereto.

9. The apparatus of claim 8, wherein said transmission line means is connected to the same remotely located communication station within the time division multiplex communication system as supplies said first input signals to said at least one phase comparator means at said given station.

10. The apparatus of claim 9, the improvement additionally comprising low-pass filter means located at each station electrically interposed between the output of said at least one phase comparator means and said one of said plurality of inputs to said signal adder means.

11. The apparatus of claim 9, the improvement further comprising:

additional phase comparator means located at certain of said communication stations in said time division multiplex communication system, said additional phase comparator means each being adapted to receive first and second input signals and produce in response thereto an output signal representative of the phase difference therebetween, said first input signals to each of said additional phase comparator means being representative of the output of a variable frequency oscillator means present at a different remotely located communication station within the time division multiplex communication system and said second input signal being representative of the output of said variable frequency oscillator means located at the same communication station within the time division multiplex communication system; and means located at each of said certain communication stations for combining the output signals of each of said phase comparator means and applying said combined signals to said one of said plurality of inputs to said signal adder means.

12. The apparatus of claim 11, wherein said signal combining means located at said certain communication stations comprises weighted averaging circuit means whereby each of the outputs from all of the phase comparator means located at said certain communication stations are individually weighted prior to their combination by the averaging portion of said weighted averaging circuit means.

13. The apparatus of claim 12, the improvement additionally comprising low-pass filter means located at each of said certain communication stations electrically interposed between the output of said weighted averaging circuit means and said one of said plurality of inputs to said signal adder means.

14. The apparatus of claim 13, additionally comprising additional transmission line means located at each of said certain of said communication stations, each of said additional transmission line means applying information representative of the output of the variable oscillator means located at a given station of said certain communication stations to phase comparator means of different remotely located stations to provide said first input signals thereto.

PO-1050
(5/69)

UNITED STATES PATENT OFFICE
CERTIFICATE OF CORRECTION

Patent No. 3,555,194 Dated January 12, 1971

Inventor(s) HIROKAZU GOTO

It is certified that error appears in the above-identified patent and that said Letters Patent are hereby corrected as shown below:

Column 1, line 13, before "that" insert --so--.

Column 2, line 43, after "effect" insert --on--.

Column 4, line 2, "an" should be --and--.

Column 6, line 49, "wh" should be --which--.

Column 7, line 17, "alternatively" should be --alternately--.

Column 8, line 48 "were" should be --where--,

"at" should be --are--;

line 63, "$f_{oi}$(Hz)" should be --f(Hz)--;

line 67, "$f_{oi}$(Hz)" should be --f(Hz)--;

line 68, "3-35" should be --32-35--;

Columns 8 and 9, lines 75 and 1, respectively, "compensate practi embodiments interstation this invention" should be --in practical embodiments of this invention,--;

Column 9, line 3, "Accordingly" should be --time--;

line 38, "ai= a2i** a3i, f" should be --ai=a2i · a3i, f--;

line 55, "a2i**2πfiav" should be --a2i · 2πfiav--.

Column 9, line 66, "see" should be --seen--;

Column 10, line 66, "lease" should be --least--.

Signed and sealed this 7th day of September 1971.

(SEAL)
Attest:

EDWARD M.FLETCHER,JR.
Attesting Officer

ROBERT GOTTSCHALK
Acting Commissioner of Pate